(12) United States Patent
Athelogou et al.

(10) Patent No.: US 9,779,499 B2
(45) Date of Patent: Oct. 3, 2017

(54) GRADING OF GLANDULAR TISSUE CANCER BY DETAILED IMAGE ANALYSIS OF STAINED TISSUE SLICES

(71) Applicant: Definiens AG, Munich (DE)

(72) Inventors: Maria Athelogou, Munich (DE); Nathalie Harder, Munich (DE)

(73) Assignee: Definiens AG, Munich (DE)

( * ) Notice: Subject to any disclaimer, the term of this patent is extended or adjusted under 35 U.S.C. 154(b) by 151 days.

(21) Appl. No.: 14/859,145

(22) Filed: Sep. 18, 2015

(65) Prior Publication Data

US 2017/0084021 A1 Mar. 23, 2017

(51) Int. Cl.
G06K 9/00 (2006.01)
G06T 7/00 (2017.01)
G06K 9/46 (2006.01)
G06K 9/52 (2006.01)

(52) U.S. Cl.
CPC .......... *G06T 7/0012* (2013.01); *G06K 9/4604* (2013.01); *G06K 9/52* (2013.01); *G06T 2207/10056* (2013.01); *G06T 2207/30024* (2013.01); *G06T 2207/30081* (2013.01)

(58) Field of Classification Search
CPC ....... G06T 7/0012; G06T 7/0085; G06T 7/60; G06T 2207/30028; G06T 2207/30081; G01N 33/5091; G06K 9/4604; G06K 9/52; G06K 2009/4666
See application file for complete search history.

(56) References Cited

U.S. PATENT DOCUMENTS

| 8,488,863 | B2* | 7/2013 | Boucheron | G06K 9/0014 382/131 |
| 8,928,887 | B2* | 1/2015 | Popescu | G01N 21/47 356/450 |
| 9,424,460 | B2* | 8/2016 | Madabhushi | G06K 9/0014 |
| 2005/0266395 | A1* | 12/2005 | Gholap | G06T 7/41 435/4 |
| 2007/0286856 | A1* | 12/2007 | Brown | A61K 31/395 424/133.1 |
| 2010/0177950 | A1* | 7/2010 | Donovan | G06F 19/3437 382/133 |
| 2013/0156279 | A1* | 6/2013 | Schoenmeyer | G06T 7/33 382/128 |

(Continued)

*Primary Examiner* — Gregory M Desire
(74) *Attorney, Agent, or Firm* — Imperium Patent Works; Darien K. Wallace

(57) ABSTRACT

An improved histopathological score is obtained by identifying objects in images of glandular tissue from cancer patients. The objects are identified based on staining by a biomarker. The score predicts that a cancer patient will have a recurrence of cancer of the glandular tissue based on a geometric characteristic of individual identified objects but not on any pattern formed by the identified objects. First objects are generated from the image of glandular tissue which has been stained with a single biomarker that stains epithelial cells. Second objects are then generated using the first objects. A geometric feature of each of the second objects is measured. A shape index is then calculated for each of the second objects based on the geometric feature, and an average shape index is calculated. Based on the average shape index, a score is determined that indicates a level of cancer malignancy of the glandular tissue.

21 Claims, 10 Drawing Sheets

(56) References Cited

U.S. PATENT DOCUMENTS

| | | | |
|---|---|---|---|
| 2013/0230230 A1* | 9/2013 | Ajemba | G06T 7/0012 |
| | | | 382/133 |
| 2014/0185891 A1* | 7/2014 | Schoenmeyer | G06T 7/0012 |
| | | | 382/128 |
| 2014/0233826 A1* | 8/2014 | Agaian | A61B 5/7267 |
| | | | 382/133 |
| 2014/0288425 A1* | 9/2014 | Shin | A61B 8/485 |
| | | | 600/438 |
| 2017/0084021 A1* | 3/2017 | Athelogou | G06T 7/0012 |

* cited by examiner

| PATIENT | BORDER INDEX * RELATIVE AREA |
|---|---|
| K | 0.7336 |
| F | 0.6596 |
| I | 0.6166 |
| L | 0.6097 |
| B | 0.6088 |
| E | 0.6000 |
| C | 0.5794 |
| G | 0.5746 |
| J | 0.5577 |
| T | 0.5167 |
| A | 0.5149 |
| D | 0.5116 |
| P | 0.5112 |
| H | 0.5041 |
| O | 0.4916 |
| N | 0.4683 |
| R | 0.4482 |
| Q | 0.4421 |
| S | 0.4286 |
| M | 0.3563 |
| U | 0.2527 |

FIG. 17

| PATIENT | AREA LUMEN TO GLAND | BORDER INDEX*AREA | REL AREA * WGTED BI | GLEASON SCORES |
|---|---|---|---|---|
| K | 0.6964 | 52.0002 | 36.2109 | 7A = 3+4 |
| F | 0.6218 | 33.9826 | 21.1294 | 7A = 3+4 |
| I | 0.5842 | 36.1602 | 21.1263 | 6 = 3+3 |
| B | 0.5699 | 36.5682 | 20.8391 | 7A = 3+4 |
| E | 0.5652 | 35.6202 | 20.1318 | 6 = 3+3 |
| J | 0.5291 | 32.5443 | 17.2197 | 6 = 3+3 |
| C | 0.5436 | 31.5177 | 17.1188 | 7B = 4+3 |
| L | 0.5800 | 27.5515 | 15.9788 | 6 = 3+3 |
| G | 0.5431 | 28.4711 | 15.4783 | 6 = 3+3 |
| A | 0.4904 | 27.5153 | 13.0166 | 7A = 3+4 |
| H | 0.4731 | 24.3409 | 11.6130 | 7B = 4+3 |
| P | 0.4771 | 23.6399 | 11.5925 | 7A = 3+4 |
| T | 0.4995 | 22.3463 | 11.1619 | 7B = 4+3 |
| D | 0.4813 | 23.0805 | 11.1086 | 8 = 5+3 |
| N | 0.4462 | 24.5567 | 10.9577 | 7A = 3+4 |
| O | 0.4691 | 17.0850 | 8.0140 | 6 = 3+3 |
| M | 0.3391 | 20.5621 | 6.9723 | 7A = 3+4 |
| Q | 0.4241 | 12.7194 | 5.3943 | 7A = 3+4 |
| R | 0.4302 | 12.3088 | 5.2948 | 7B = 4+3 |
| S | 0.4143 | 10.1861 | 4.2203 | 6 = 3+3 |
| U | 0.2460 | 12.9061 | 3.1755 | 7B = 4+3 |

HISTOPATHOLOGICAL SCORES

FIG. 18

GRADING OF GLANDULAR TISSUE CANCER BY DETAILED IMAGE ANALYSIS OF STAINED TISSUE SLICES

TECHNICAL FIELD

The present invention relates to an improvement in prostate cancer grading over the conventional Gleason method by quantitatively analyzing individual glands in slices of stained tissue.

BACKGROUND

Prostate cancer is one of the most commonly diagnosed cancers in men. Currently, the most accurate diagnosis of prostate cancer is determined using the Gleason grading system of analyzing stained prostate biopsies. The Gleason grading system was developed in the 1960s by Donald Gleason, a pathologist at the Veterans Administration, and was modified and improved in 2005 by the International Society of Urological Pathology. The Gleason grading system indicates the severity of the prostate cancer by correlating patterns in prostate biopsy specimens with tumor mortality rates. The Gleason method evaluates the glandular architecture of the prostate tissue based on the relative sizes of separate prostate glands and the regularity of the overall pattern of the glands. Tissue in which some glands are large and neighboring glands are small is graded as being more malignant and results in a worse prognosis. In addition, glands arranged in a disorganized, irregular pattern with only a small area of stroma between the glands are graded as being more malignant.

Cancerous prostate tissue is classified into five grades 1 through 5 of decreasing regularity. The grades of the two patterns that cover the largest areas of the biopsy tissue are added to obtain the Gleason score. The primary Gleason grade must be greater than 50% of the total pattern of the cancerous tissue. The secondary Gleason grade must be less than 50%, but at least 5%, of the pattern of the total cancer observed. If the secondary pattern covers less than 5% of the total area of observed cancer, the secondary grade is assigned the same grade as the primary grade. The sum of the primary and secondary Gleason grades is the Gleason score. For example, if the most prevalent pattern falls within grade 4 and the second most prevalent pattern falls within grade 3, then the Gleason score is 7.

Gleason grading is typically performed by a pathologist who visually evaluates a magnified image of a stained tissue sample. The pathologist manually inspects each cancerous area of a slide of stained tissue, classifies the patterns of the glands in each area based on the regularity and arrangement of the glands, and assigns a Gleason grade to each area of the tissue being graded. Then the pathologist determines the overall Gleason score for the tissue sample based on which Gleason grade was assigned to the largest area and to the second largest area of the tissue.

Manually grading prostatic tissue is difficult because the pathologist must evaluate a large number of cancerous areas consistently over a highly magnified image of stained tissue. The pathologist may not miss any cancerous areas. Moreover, the pathologist must consistently evaluate the gland patterns in the various areas of the tissue slide and other tissue slides in order to obtain an accurate Gleason score.

A method is sought for improving the prognostic accuracy of grading performed on stained prostate tissue by reducing the inconsistencies and missed areas that commonly occur with manual Gleason grading.

SUMMARY

An improved histopathological score is obtained by identifying objects in digital images of glandular tissue from cancer patients. The objects are identified based on staining by a biomarker. The score predicts that the cancer patient will have a recurrence of cancer of the glandular tissue based on a geometric characteristic of individual identified objects but not on any pattern formed by the identified objects. First objects are generated from a digital image of glandular tissue that has been stained with a single biomarker that stains epithelial cells. Second objects are then generated using the first objects. A geometric feature of each of the second objects is measured. A shape index is then calculated for each of the second objects based on the geometric feature. An average shape index is determined of the second objects. A score is determined based on the shape index that indicates a level of cancer malignancy of the glandular tissue. The score indicates cancer malignancy and predicts cancer recurrence in glandular tissue such as prostate tissue, breast tissue, colon tissue and lung tissue. In one implementation, the glandular tissue is prostate tissue obtained from a cancer patient who has had a radical prostatectomy in which the patient's malignant prostate gland has been completely removed. In another implementation, the glandular tissue is a needle tissue sample taken from the prostate gland of a cancer patient.

In another embodiment, a novel method for generating an histopathological score that predicts the recurrence of glandular tissue cancer is based on geometric features of individual glands as opposed to the overall architecture or pattern of the glandular tissue. First objects are generated using image analysis of a digital image of a slice of tissue from a cancer patient that has been stained with a stain that stains luminal epithelial cells. Second objects are generated that are surrounded by the first objects. A shape index is determined for each of the second objects. The shape index is calculated based on a measured geometric feature of each of the second objects. The average shape index of the second objects is determined. The method predicts that the cancer patient will likely have a recurrence of cancer if the average shape index is less than a predetermined threshold value. The prediction that the cancer patient will likely have a recurrence of cancer predicts that the cancer patient will have a recurrence of measurable amounts of prostate-specific antigen (PSA) in the cancer patient's blood.

The shape index is calculated based on geometric features such as the length, width, border length, area, asymmetry, elliptical fit, roundness, and number of branches of the second objects. The shape index for each of the second objects is not based on any characteristic of any other second object. In one aspect, the second objects are unstained areas on the digital image that are surrounded by luminal epithelial cells stained by cytokeratin 18 (CK18).

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 17 is a table listing a histopathological score generated from images of each of the twenty-one prostate cancer patients.

FIG. 18 is a table listing another histopathological score generated from images the twenty-one prostate cancer patients by multiplying a relative-area index by a weighted border index.

DETAILED DESCRIPTION

Reference will now be made in detail to some embodiments of the invention, examples of which are illustrated in the accompanying drawings.

Figure 1:
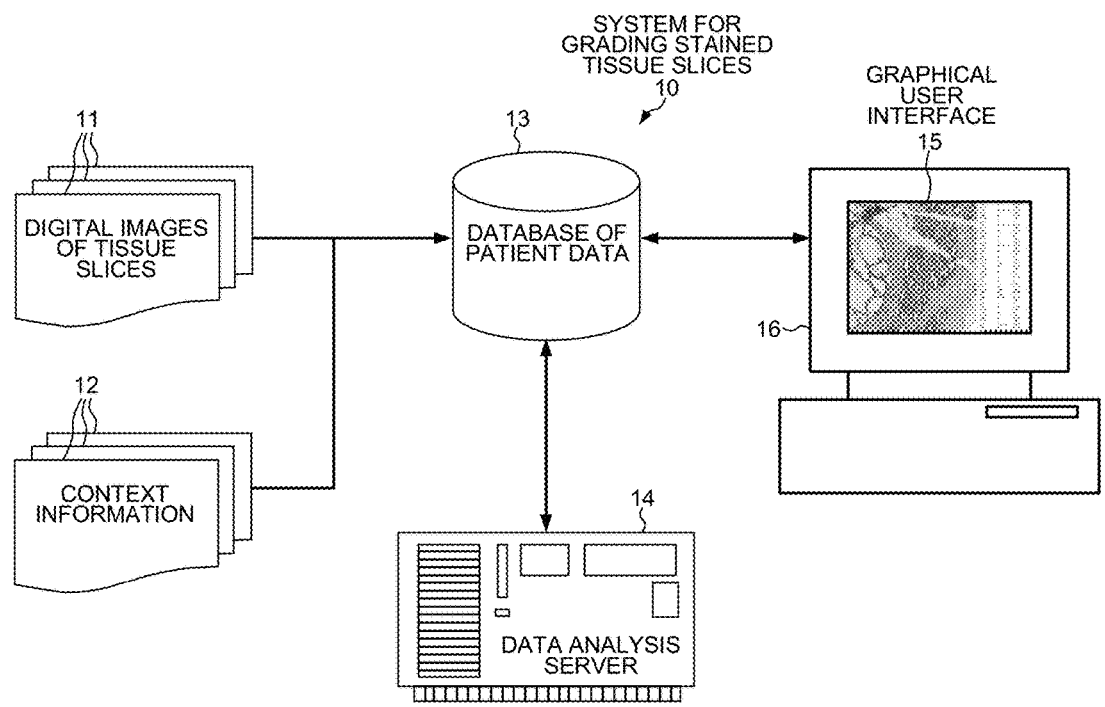
FIG. 1 is a diagram of a novel system for generating an histopathological score by defining image objects in digital images of stained glandular tissue.

FIG. 1 shows a system 10 for grading stained samples of glandular tissue, such as human prostate, breast, colon or lung tissue. In order to perform the novel grading method for glandular tissue cancer described herein, immunohistochemistry samples are stained with a single stain, such as cytokeratin 18 (CK18), transcription factor p63 or hematoxylin and eosin (H&E). Staining with multiple biomarkers is not required for the novel grading method. Digital images 11 of the tissue slices are then acquired at high magnification. The input data for the image analysis can also include patient medical history and demographic data that is used as context information 12 for calculating parameters used in the image analysis. For example, identifying areas of cancerous glands can be assisted by knowing the patient's age, whether the patient smokes or whether there is a history of cancer in the patient's family.

The acquired digital images 11 as well as the context information 12 are stored in a database 13 of patient data. Image analysis software executing on a data analysis server 14 then performs intelligent image processing and automated classification and quantification. Thus, data analysis server 14 includes a computer-readable storage medium having program instructions thereon for performing a method for predicting the recurrence of glandular cancer. Such a computer-readable storage medium can include instructions for generating objects in digital images that have been stained by a particular biomarker and for identifying and defining those objects based on geometric features. The image analysis software is a computer program product tangibly embodied on the computer-readable storage medium in server 14 and comprises computer readable and executable program instructions that when executed by a processor on server 14 provide a visual display on a graphical user interface 15 of an interconnected display device 16, such as a personal computer. The image analysis software transforms unlinked input data in the form of pixels into a hierarchical network of linked objects.

System 10 analyzes, grades and displays the digital images 11 of tissue slices that have been stained with one of various biomarkers. The image analysis program prepares links between some objects and thereby generates higher hierarchically ranked objects. The image analysis program provides the higher hierarchically ranked objects with properties, classifies them into classes and subclasses, and then links those objects again at a still higher level to other objects. The higher hierarchically ranked objects are used to find target objects in the images more rapidly. More easily detected starting objects are first found and then used to identify harder-to-find objects in the hierarchical data structure.

Both general and subject-specific knowledge is used to classify and segment objects in the images. The knowledge and the program flow of the image analysis program are separated in the software structure. The parameters by which the image analysis is performed, for example thresholds of size or brightness, can be changed without having to revise the process hierarchy of software steps. The image analysis software displays both the original digital images 11 as well as the corresponding processed segmented images on the graphical user interface 15. Classified and segmented objects in the digital images are marked or highlighted to correspond to their classification. For example, objects that have a membership in the same class are depicted in the same color.

Figure 2:
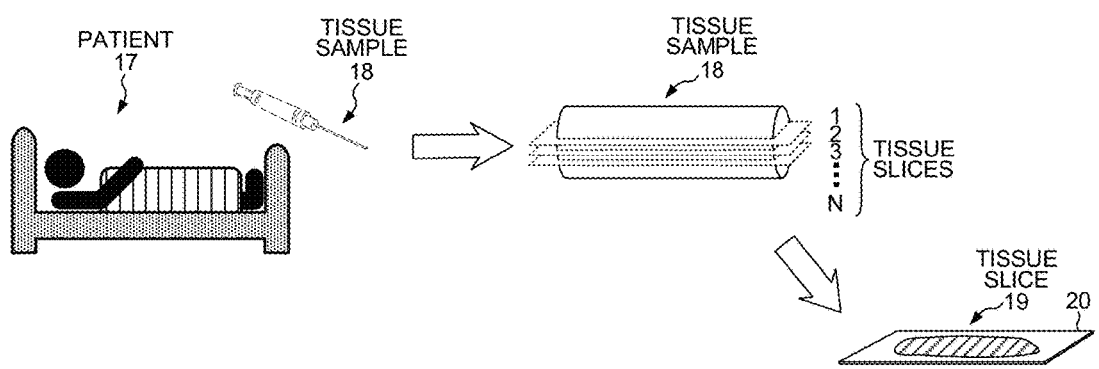
FIG. 2 illustrates the process for acquiring the digital images of stained glandular tissue that are scored by the system of FIG. 1.

FIG. 2 illustrates the process for acquiring the digital images 11 that are analyzed, graded and displayed by system 10. The tissue portions that are to be stained with one of various protein and receptor biomarkers are typically taken from a live patient 17 in the form of a biopsy. In order to perform grading of cancerous prostate tissue, immunohistochemistry samples are prepared from paraffin-embedded biopsy specimens of prostate tissue surgically removed from patient 17. The novel grading method for glandular tissue cancer is especially suited to predicting whether there will be a return of cancer after a radical prostatectomy in which the patient's malignant prostate gland has been completely removed. Various portions of the removed prostate gland are then sliced into many adjacent thin planar slices. If the prostate gland was not removed, prostate needle biopsy specimens are used. The prostate needle biopsy should include at least ten to twelve needle core samples.

The protein called prostate-specific antigen (PSA) is produced by prostate cells. After a malignant prostate gland has been completely removed, no level of PSA is usually measurable in the patient's blood because the prostate cells that produce PSA have been removed. However, if the cancer in the prostate gland was particularly malignant, some cancerous prostate cells may have metastasized and spread to other parts of the patient's body, where they continue to produce PSA. A blood test showing a return of a measurable PSA level indicates a recurrence of the prostate cancer, which can transform into other forms of cancer. A conventional Gleason score is not a good predictor of the recurrence of prostate cancer after a radical prostatectomy. Although a Gleason score indicates the severity of the cancer in the prostate gland, the Gleason score is not a good predictor of whether the cancer will eventually progress to metastasis. The novel grading method for glandular tissue cancer can much better predict whether there will be a biochemical recurrence of prostate cancer following a radical prostatectomy.

Before being put on a slide, each slice is stained with one of several possible biomarkers. FIG. 2 illustrates a tissue sample 18 that is sliced into many adjacent thin planar slices. A slice 19 is stained with a biomarker and then placed on a slide 20. The same tissue reacts uniquely to each different biomarker. The novel grading method requires the tissue to be stained with only a single biomarker, such as cytokeratin 18 (CK18). Conventional Gleason grading, on the other hand, typically requires multiples stains, such as hematoxylin and eosin (H&E), cytokeratin 18 (CK18) and transcription factor p63. Other stains that can be used for the novel grading method include cytokeratin 14 (CK14), Human Epidermal growth factor Receptor 2 (Her2), Her2/neu cytoplasmic stain, estrogen receptor (ER) stain, progesterone receptor (PR) stain, tumor marker Ki67, Mib, SishChr17, SishHer2, cluster of differentiation 44 (CD44) antibody stain, CD23 antibody stain, hematoxylin and eosin (H&E) and transcription factor p63 (also known as tumor protein p63 and transformation-related protein 63). A high resolution digital image 11 is then taken of each stained slice. A typical digital image of a tissue slice has a resolution of 100,000×200,000 pixels, or 20 billion pixels.

Figure 3:
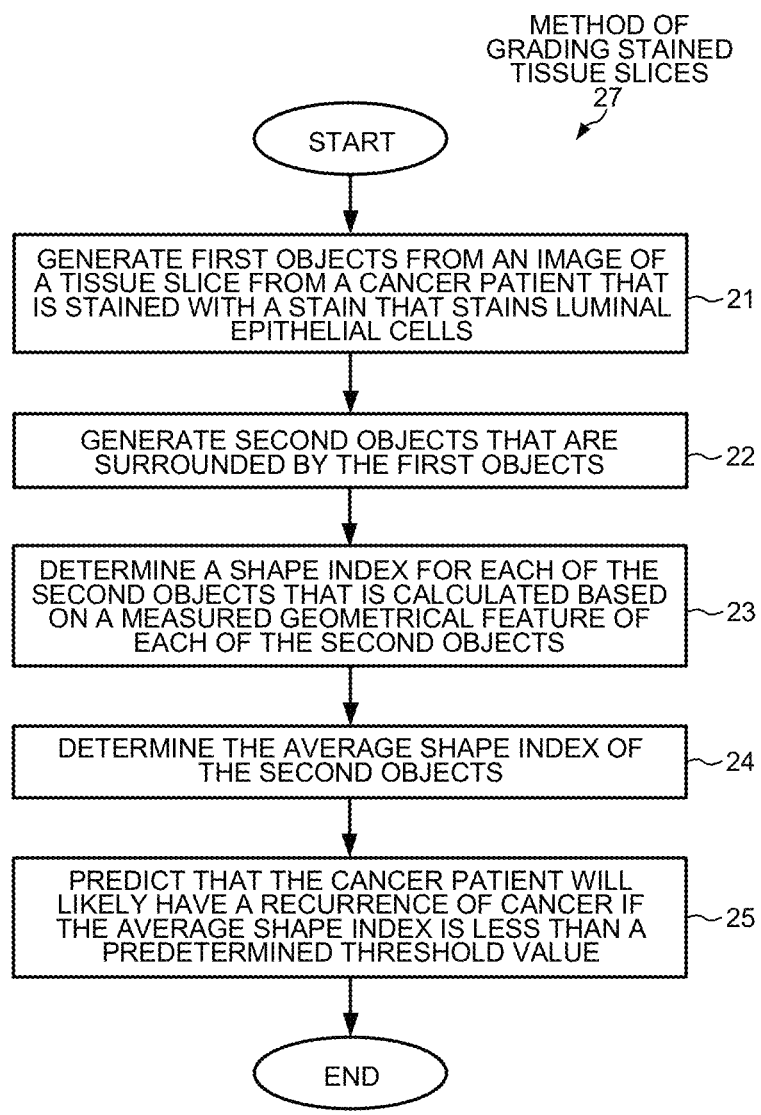
FIG. 3 is a flowchart of steps for obtaining an improved histopathological score that predicts the recurrence of glandular tissue cancer.

FIG. 3 is a flowchart of steps 21-25 of a method 27 for generating an improved histopathological score that predicts the recurrence of glandular tissue cancer. In a first step 21, system 10 generates first objects from a digital image of slice 19 of tissue from cancer patient 17 that has been stained with a biomarker that stains luminal epithelial cells. In a first embodiment, the biomarker used to stain slice 19 is cytokeratin 18 (CK18), which stains luminal epithelial cells. CK18 is a protein-specific monoclonal antibody (a biomarker) that in humans is encoded by the gene KRT18/PIG46/CYK18. CK18 is used together with an attached dye to form a stain. In another embodiment, slice 19 is stained with tumor protein p63, which stains basal epithelial cells by staining the nuclei inside the basal epithelial cells. Tumor protein p63 is a protein-specific antibody that in humans is encoded by the TP63 gene. Tumor protein p63 is also used together with an attached dye to form a stain. Note that some biomarkers do not require an attached dye, such as hematoxylin and eosin (H&E), which has the ability to stain tissue without the addition of a dye. Staining with p63 is used to differentiate prostatic adenocarcinoma (the most common type of prostate cancer) from benign prostatic tissue. Expression of the p63 gene is down-regulated in adenocarcinoma of the prostate compared with normal prostate tissue. Thus, p63 stains the nuclei of basal epithelial cells in healthy prostate glands.

Figure 4:
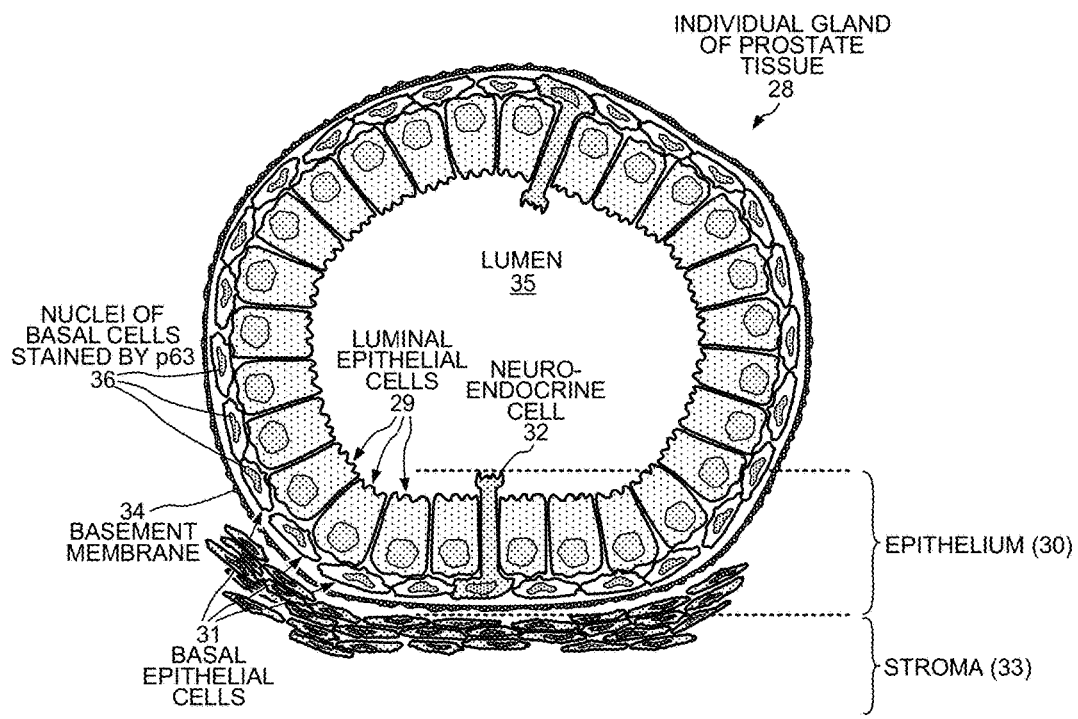
FIG. 4 is a schematic diagram of an individual gland of prostate tissue in which cytokeratin 18 (CK18) has stained the luminal epithelial cells.

FIG. 4 illustrates the structure of an individual gland 28 of normal prostate tissue in which CK18 has stained the luminal epithelial cells 29. Immunohisto-chemical staining for CK18 can also be used to stain other types of epithelial organs, such as the breasts, lungs, ovaries and kidneys. Normal prostatic epithelium 30 is composed of luminal 29, basal 31, and neuroendocrine 32 cells that form glands surrounded by fibro-muscular tissue called stroma 33. A basement membrane 34 separates the gland 28 from the stroma 33. Each gland is composed of rows of epithelial cells located around a "lumen" or duct 35. Tumor protein p63 does not stain the nuclei 36 of the basal epithelial cells 31 in cancerous prostate tissue in which the basement membrane 34 no longer surrounds the basal cells 31. Thus, cancerous basal cells that do not have intact basement membranes do not express p63, whereas healthy and less malignant prostate basal cells express p63. The difference in p63 expression is also indicative of cancer progression in other epithelial organs, such as the breasts, lungs and ovaries.

Figure 5:
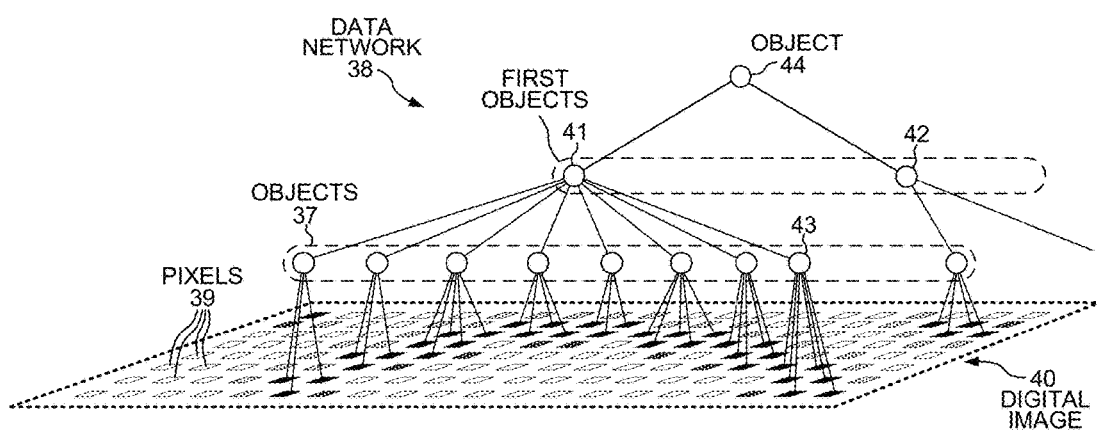
FIG. 5 illustrates a data network generated by the system of FIG. 1 in which image objects of the data network are linked to selected pixels of an image of stained glandular tissue.

FIG. 5 illustrates first objects 37 of an exemplary data network 38 that are generated by system 10 in step 21 based on the stained luminal epithelial cells 29. The image analysis program of system 10 uses object-oriented image analysis to generate objects of data network 38 by linking selected pixels 39 to objects according to a process hierarchy of steps and algorithms and according to a classification network. Image analysis is performed on each of the images acquired by system 10, including a digital image 40 of tissue slice 19, to generate a hierarchical data network 38 of image objects for each image. For a more detailed description of generating a data network using a process hierarchy and a class network, see U.S. Pat. No. 8,319,793, the contents of which are incorporated herein by reference. Each digital image comprises pixel values associated with the locations of each of the pixels 39. The image analysis program operates on the digital pixel values and links the pixels to form objects. Each object is linked to a set of pixel locations based on the associated pixel values. For example, an object is generated by linking to the object those pixels having similar characteristics, such as hue, saturation and brightness as defined by the pixel value. Thresholds of brightness at pixel locations that are grouped together can be obtained from a histogram of the pixel values in the digital image. The pixels form the lowest hierarchical level of data network 38.

In the first step 21, pixels having the color and intensity imparted by the dye attached to the CK18 antibody are identified and linked to those image objects 37 that correspond to the stained luminal epithelial cells 29. The image objects 37 form the second hierarchical level of data network 38. Then image objects 37 are linked together in classes according to membership functions of the classes defined in the class network. For example, objects representing luminal epithelial cells that belong to the same gland are linked together to form the first objects 41-42 in a third hierarchical level of data network 38. In FIG. 5, one of the objects 43 that corresponds to a stained luminal epithelial cell is linked to first object 41 that corresponds to an individual gland. An additional object 44 is generated in a fourth hierarchical level of data network 38 and is linked to all of the first objects that represent glands with stained luminal epithelial cells. Thus, the first objects 41-42 that are to be analyzed are linked to a higher order image object 44. System 10 can generate the first objects 41-42 based on pixels having the color of a single stain. Multiple stains are not required to perform method 27.

In a second step 22 of the improved scoring method 27, second objects are generated that are surrounded by the first objects 41-42. The first objects 41-42 are the rings of luminal epithelial cells 29 that have undergone immunocytochemical staining by CK18. The second objects are the lumens 35 that are surrounded by the luminal epithelial cells 29. In FIG. 5, a second object 45 (not shown) would be linked to the lighter pixels that are surrounded by the ring of darker pixels that are linked to the objects between objects 37 and 43.

Figure 6:
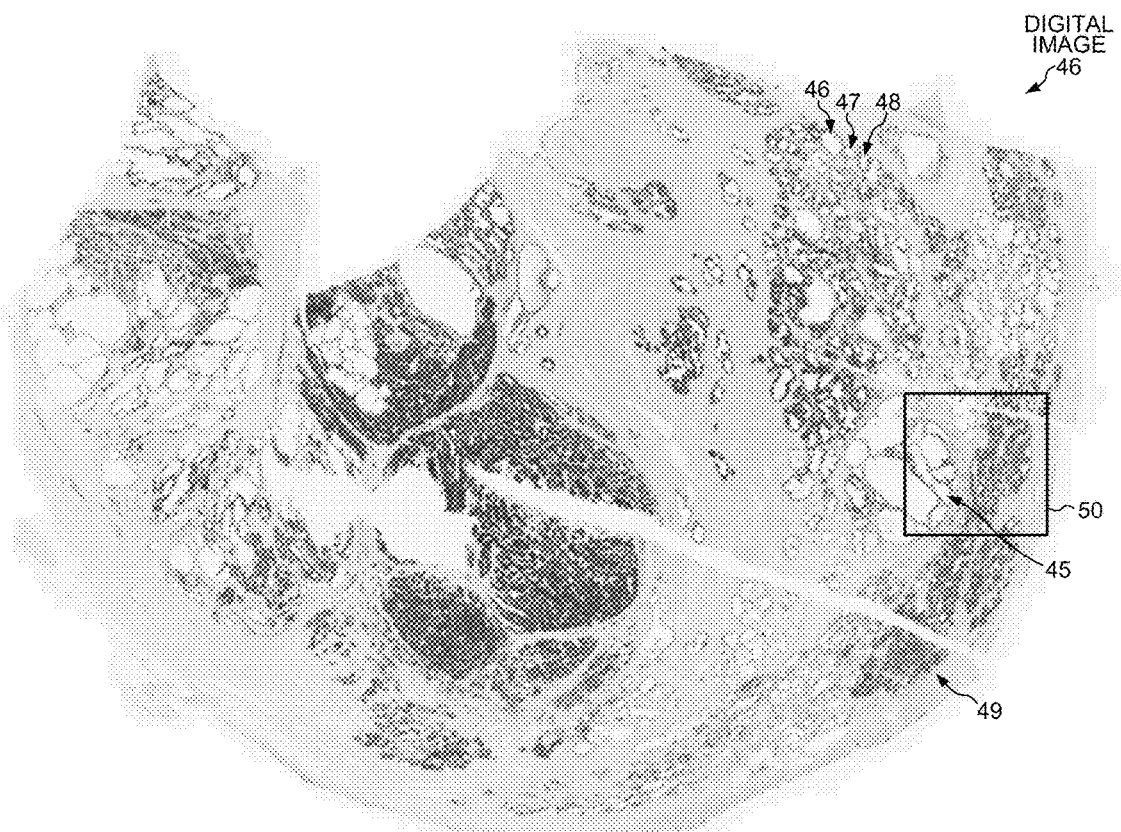
FIG. 6 is a digital image of a tissue slice in which the luminal epithelial cells have been stained with CK18.

FIG. 6 shows a high-resolution digital image 46 of tissue slice 19 from cancer patient 17 that has been stained with a biomarker that stains luminal epithelial cells. In this first embodiment, cytokeratin 18 (CK18) has stained the luminal epithelial cells 29 brown, and the lumens are the lighter areas surrounded by the stained cells 29. In a second embodiment, tumor protein p63 stains the nuclei 36 of healthy and less malignant basal epithelial cells 31, which surround the lighter areas of the lumens. In FIG. 6, the darker stained luminal epithelial cells 29 form rings or loops around the lighter lumens 35 of the individual prostate glands. Four lumens 45-48 are labeled in FIG. 6.

It is apparent from FIG. 6 that the individual glands can be characterized as belonging to regions of glands with larger lumens, medium sized lumens and smaller lumens. For example, lumen 45 is part of a region of glands with larger lumens. The lumens 46-48 belong to a region of glands with medium sized lumens. And the glands of region 49 have smaller lumens. This differing glandular architecture of the prostate tissue based on the relative sizes of the individual prostate glands and the regularity of the overall pattern of the lumens is the basis for grading using the conventional Gleason method. However, the size of one lumen relative to the size of a neighboring lumen and the overall pattern made by the individual lumens in a localized region are not used as the basis for the prediction made using method 27. Gleason scoring is described in more detail below in order to compare and contrast the improved histopathological scoring method 27 with the conventional Gleason method.

Figure 7:
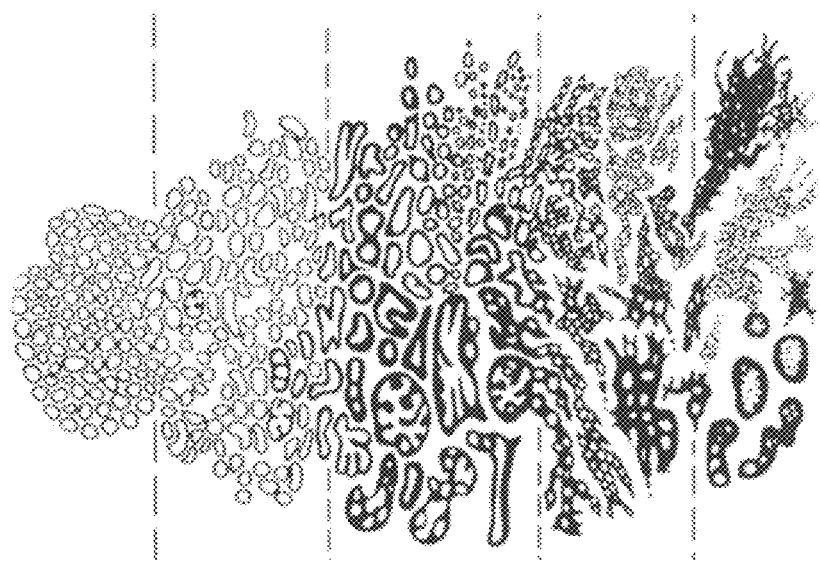
FIG. 7 is a diagram of sample patterns of prostate tissue that fall into the five Gleason scoring patterns for prostatic adenocarcinoma.

FIG. 7 illustrates sample tissue patterns that fall within the five Gleason categories. A pathologist assigns one of the Gleason patterns to each field of view as the pathologist scans the entire digital image 46. Then the pathologist determines which Gleason pattern covers the most area of the digital image 46. FIG. 7 shows that the Gleason pattern one is composed of small, uniform lumens and glands. Pattern two includes more stroma between the glands. Although the gland size of pattern two has a wider distribution, the average gland size of pattern two is nearly the same as for pattern one. In pattern three, cells begin to infiltrate the glands at the margins of the glands. In pattern four, there are irregular masses of cells with fewer glands. Pattern five is characterized by a lack of glands, and the prostate tissue includes clumps and sheets of cells. It is apparent that each of the various regions of digital image 46 in FIG. 6 could be assigned to one of the five Gleason patterns shown in FIG. 7.

The Gleason method has two major drawbacks that are overcome by the improved scoring method 27. First, it is difficult visually to evaluate the large number of localized regions of a high resolution image of stained tissue consistently. It is a tremendous challenge for the pathologist to avoid missing any areas of prostatic adenocarcinoma on each slide as the pathologist inspects the tissue in the smaller field of view while navigating across the much larger high-resolution images. Assigning a Gleason pattern one to a region of tissue is especially difficult because healthy prostate tissue also has the small, uniform glands that are indicative of the Gleason pattern one. In addition, it is also a challenge for the pathologist to classify different regions of the tissue on different slides consistently according to the five Gleason tissue patterns. The novel scoring method 27 does not rely on identifying architectural patterns in prostate tissue, so no visual inspection of tissue patterns is required. Instead, only the geometric features of individual glands are considered. Moreover, the image analysis program of system 10 uses object-oriented image analysis to grade all of the lumens in the glandular tissue on the slide 20, so visual inspection is not required at all.

Second, even if the visual evaluation results in an accurate Gleason score, that score is not a good predictor of the likelihood of biochemical recurrence of prostate cancer following a radical prostatectomy. The Gleason score does not provide a good differentiation among patients in the intermediate prognosis area between high and low risk of recurrence. For example, patients who all have Gleason scores of seven can have dramatically different chances of biochemical recurrence of prostate cancer as revealed by subsequent measurable PSA levels. Thus, there has been an attempt to divide the Gleason score of seven into 7A and 7B. One definition of a 7A score is the combination of Gleason grades 3+4, whereas a 7B score results from Gleason grades 4+3 (i.e., having more localized regions with grade 4 than with grade 3). Another definition of a 7A Gleason score is primary and secondary grades of three and four with no tertiary grade of five, whereas a 7B Gleason score includes a tertiary grade of five. But even compared to modified Gleason scoring using 7A and 7B, the novel scoring method 27 is a much better predictor of the recurrence of prostate cancer following a radical prostatectomy. Patients whose prostate tissue is scored as either 7A or 7B both have similar likelihoods of a recurrence of measurable PSA levels following removal of their prostate glands. Evidently, the architectural patterns in glandular tissue provide a good indication of the malignancy or severity of the cancer but do not accurately predict the likelihood that the cancer has metastasized, i.e., that some cancer cells have already escaped the prostatic capsule.

In a third step 23 of the scoring method 27, a shape index is determined for each of the second objects 45-48 (lumens 35) in digital image 46. The shape index is determined based on the lighter areas in image 46 that are surrounded by stained areas. However, lighter pixels surrounded by darker pixels around the periphery of digital image 46 are not classified as second objects because they are probably image sensor artifacts or artificial structures at the cut edges of the tissue. There are more than 21,000 second objects in digital image 46. The image analysis program of system 10 calculates the shape index based on a measured geometric feature of each of the second objects. The shape index for each second object is not based on any characteristic of any neighboring second object. The determination of an exemplary shape index is now described for second object 45 in region 50. The "border index" is an exemplary shape index that results in a good prediction of the likelihood of measurable levels of prostate-specific antigen (PSA) being detected in a patient's blood following a radical prostatectomy.

Figure 8:
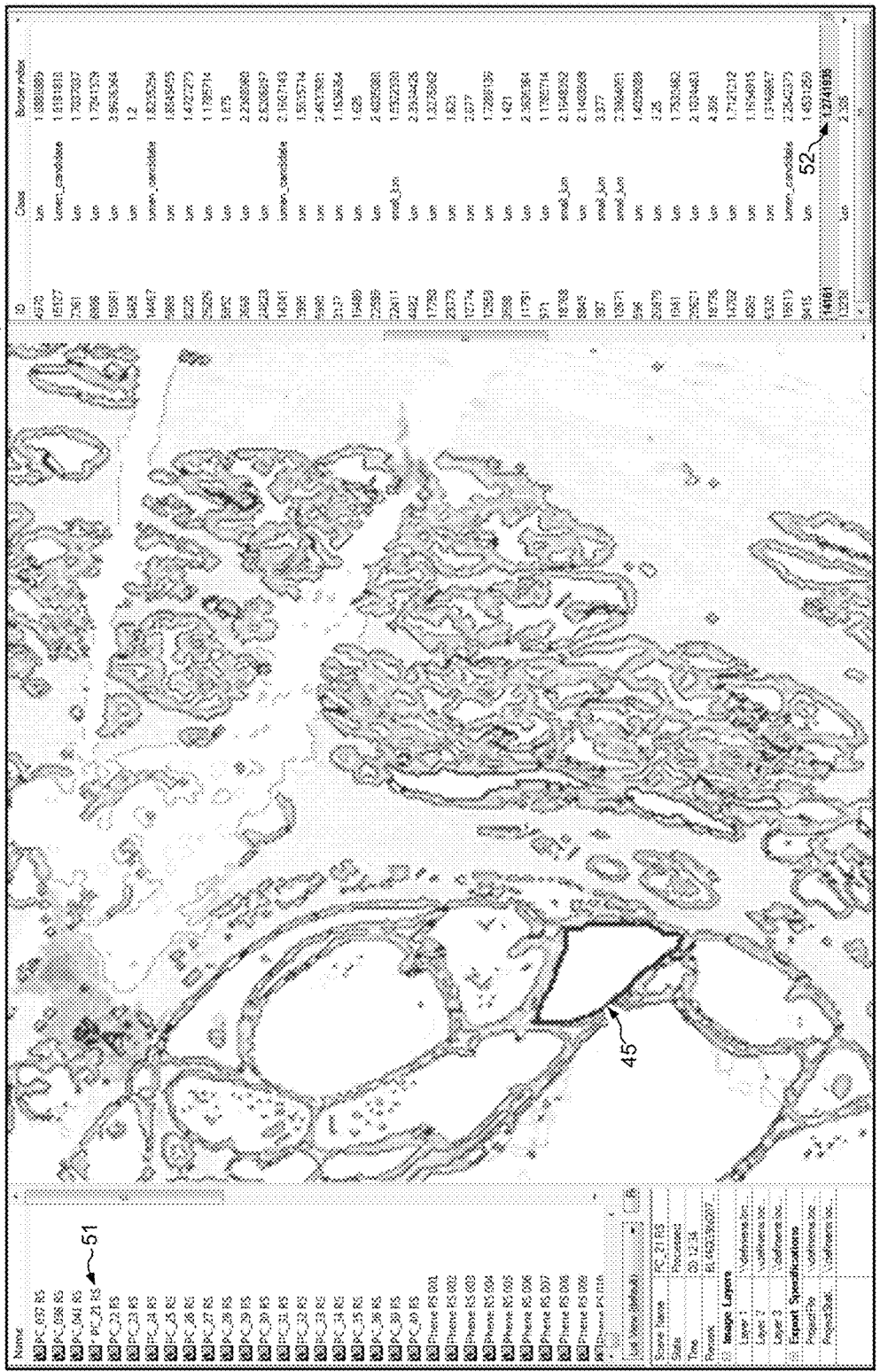
FIG. 8 shows the graphical user interface of the system of FIG. 1 in which a lumen identified by the surrounding stained luminal epithelial cells has been highlighted.

FIG. 8 shows region 50 of digital image 46 displayed on graphical user interface 15 of system 10 after step 23 has been performed. The frame towards the left on graphical user interface 15 indicates (see arrow 51) that the image in the center is a portion of digital image "PC_21 RS" 46. The left frame shows that digital images of prostate tissue from many other patients were also analyzed. The border indices for selected second objects in digital image 46 are listed in the frame towards the right on graphical user interface 15. For example, the border index of second object 45 having ID number 14161 is listed as 1.2741935 (see reference numeral 52). Note that some of the image objects listed in the frame at the right are not second objects, which belong to the "lumen" class. Instead, some of the image objects belong to the "small lumen" class or to the "lumen candidate" class. In subsequent optimization of the image analysis, however, certain objects in the "lumen candidate" class can be reclassified as belonging to the "lumen" class. Only the border indices of second objects are considered in step 23. In one embodiment, single-pixel light areas surrounded by stained pixels are also excluded from the "lumen" class of second objects. These small image objects are likely merely image sensor artifacts.

The method for calculating the border index of second object 45 is described below. The border index is defined as BI=(border length)/(2*(length+width)). The border length is the length in pixels around the periphery of the second object. For example, a single-pixel object has a border length of four, a two-pixel object has a border length of six, and a three-pixel object has a border length of eight.

Figure 9:
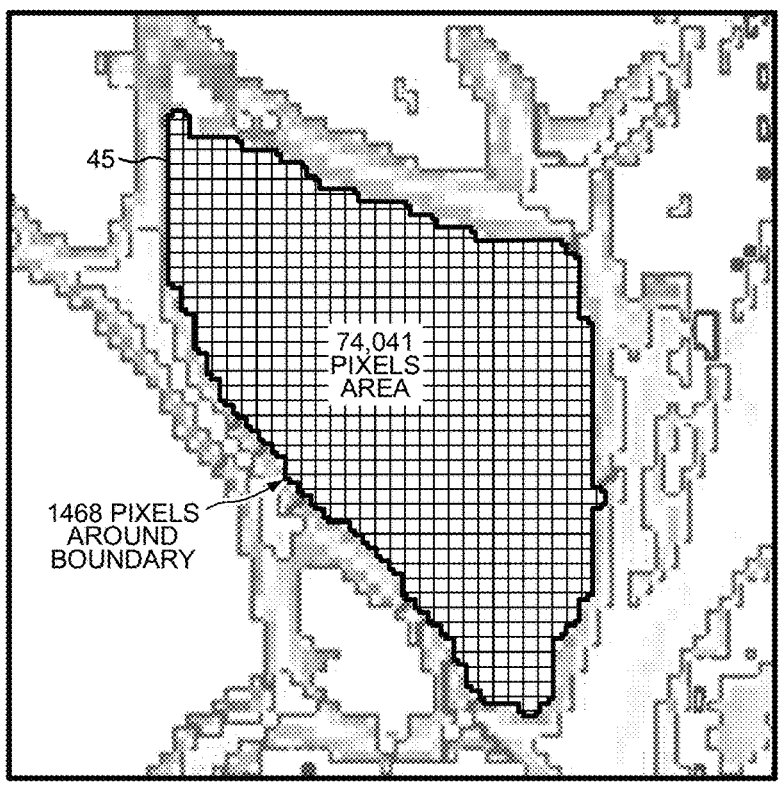
FIG. 9 is a more detailed view of the lumen identified in FIG. 8 showing the border length and the area of the lumen.

FIG. 9 illustrates that the border length around second object 45 is 1,468 pixels. The length and width values used to calculate the border index are the dimensions of a rectangle that has the same area as the second object, but that is formed based on the smallest ellipse that can enclose the second object. FIG. 9 illustrates that the area of second object 45 is 74,041 pixels.

Figure 10:
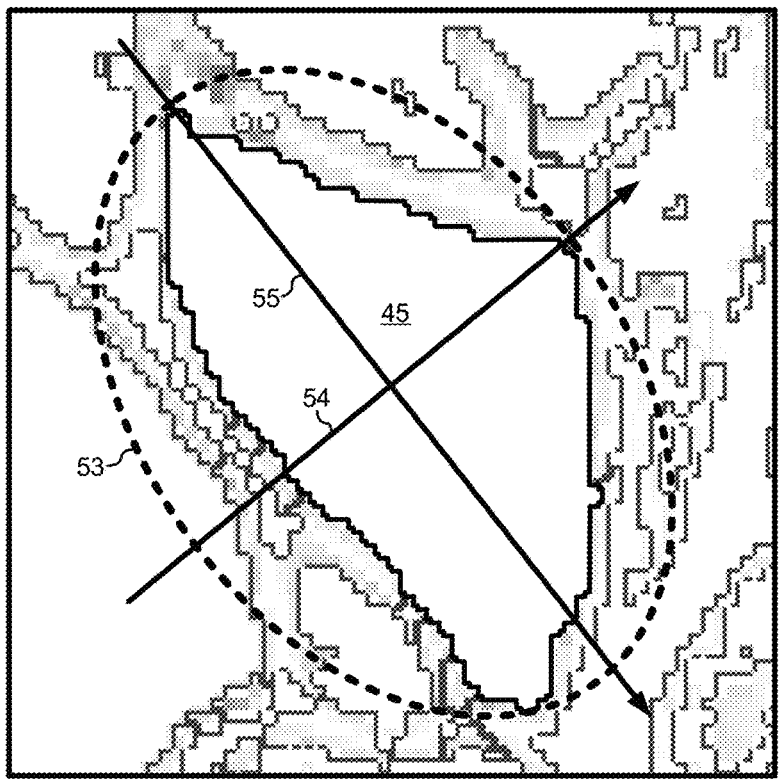
FIG. 10 illustrates the smallest ellipse that can enclose the lumen identified in FIG. 8.
Figure 11:
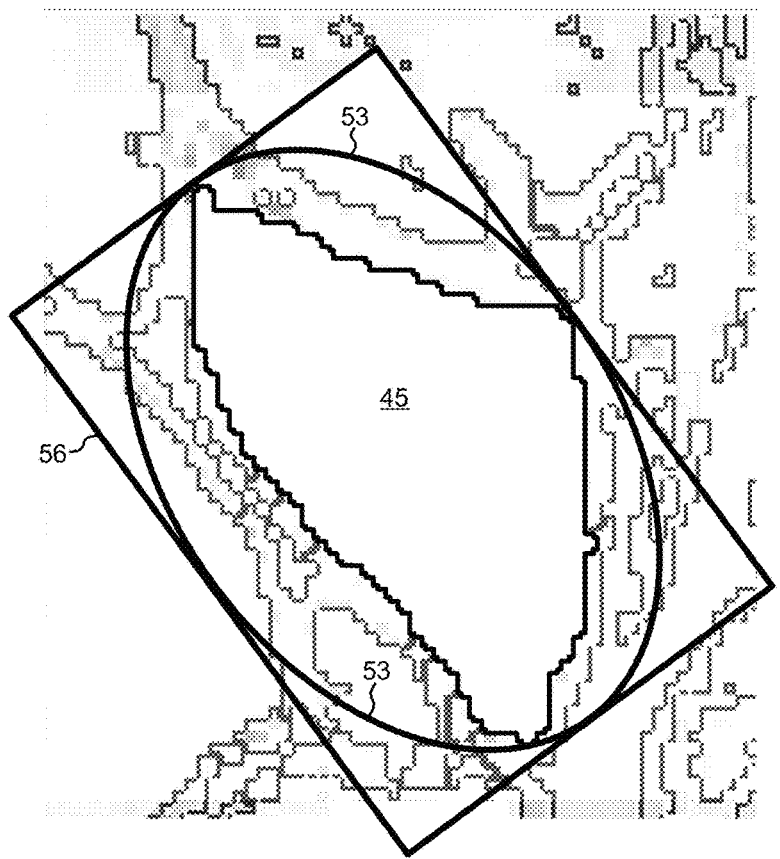
FIG. 11 illustrates a larger rectangle that encloses the ellipse of FIG. 10.
Figure 12:
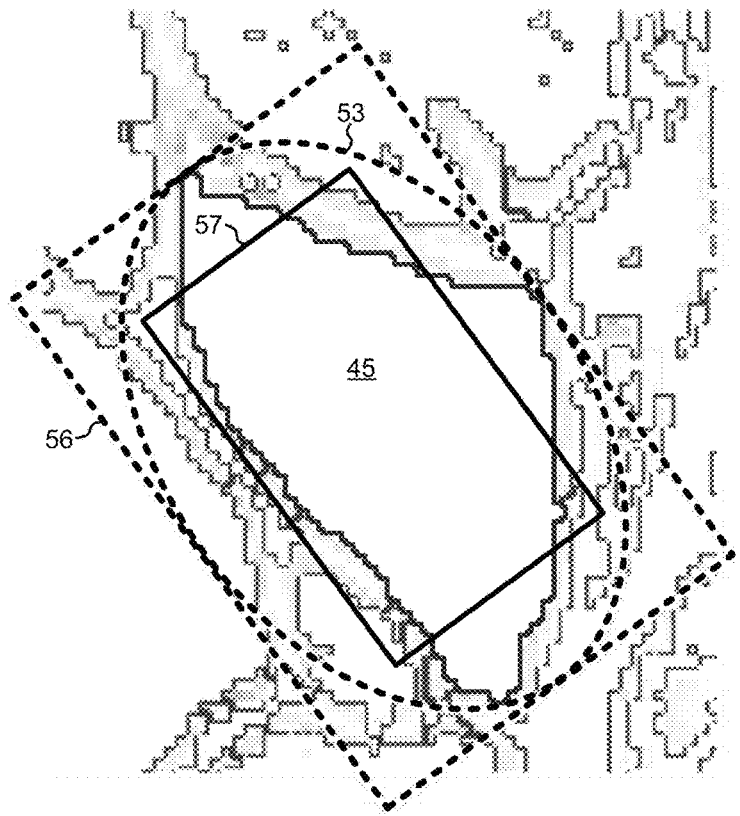
FIG. 12 illustrates a smaller rectangle centered in the ellipse of FIG. 10 that has the same relative length and width as the larger rectangle of FIG. 11.
Figure 13:
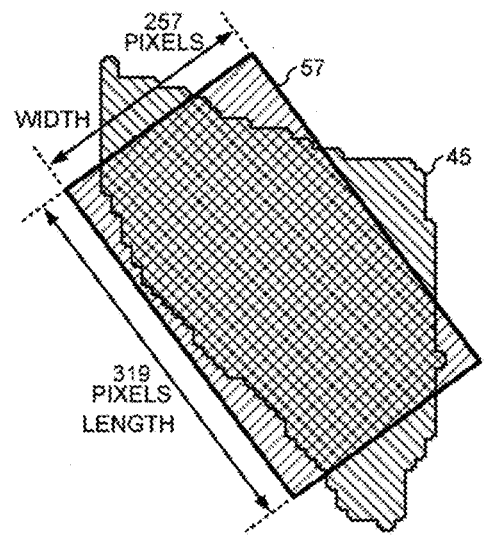
FIG. 13 illustrates that the smaller rectangle of FIG. 12 superimposed over the lumen identified in FIG. 8 both have the same total area.

FIG. 10 shows the smallest ellipse 53 that can enclose second object 45. The short and long axes 54-55 of ellipse 53 are used to orient a larger rectangle 56 that encloses the ellipse 53. FIG. 11 shows larger rectangle 56. Then a smaller rectangle 57 with the same relative length and width as larger rectangle 56 is centered on the axes 54-55 of the ellipse 53. The smaller rectangle 57 has the same area as the second object 45. FIG. 12 shows the smaller rectangle 57 centered in the ellipse 53. FIG. 13 shows smaller rectangle 57 superimposed over second object 45. Both smaller rectangle 57 and second object 45 have an area of 74,041 pixels. The length and width of the smaller rectangle 57 are used in the calculation of the border index. The length of the smaller rectangle 57 is 319 pixels, and the width of the smaller rectangle 57 is 257 pixels. The border index for second object 45 is 1468 pixels divided by 2*(319 pixels+257 pixels), which equals 1.274.

In a fourth step 24 of the scoring method 27, the average shape index of all of the second objects is determined. In this example, the shape index is the border index, which has an average value of 1.0616 for the approximately 21,000 second objects in digital image 46. The average value of the border index for all second objects is smaller than the 1.274 value for the triangular-shaped second object 45 in large part because of the high proportion of smaller lumens in the tissue that have more circular shapes. A circle has a border index of 0.886 ($\sqrt{\pi}/2$). In an embodiment in which one-pixel objects are not excluded from the "lumen" class, second objects that are one pixel large also lower the average border index because a single pixel also has a border index of 0.886. A lower average border index indicates that the tissue has a higher proportion of glands whose lumens have an area that is only one or a few pixels large.

In a final step 25, system 10 predicts that the cancer patient 17 will likely have a recurrence of cancer if the average shape index is less than a predetermined threshold value. A recurrence of cancer is likely if it is more likely than not that measurable PSA levels will again be detected in the patient's blood after the patient's radical prostatectomy. In this case where the border index is used as the shape index, the predetermined threshold value is set at 1.051. The threshold value is determined empirically by calculating the border index for many patients whose post-operation PSA levels are known. Patients who later had a recurrence of measurable PSA levels in their blood after the removal of their prostate glands tended to have lower border indices in their prostate tissue at the time of their radical prostatectomy. Patients whose PSA levels remained low or non-existent tended to have border indices above 1.051. Because the 1.0616 average border index for digital image 46 of prostate tissue from patient 17 is not less than the predetermined threshold of 1.051, system 10 predicts that patient 17 is not likely to have a recurrence of cancer following his radical prostatectomy. Thus, system 10 predicts that patient 17 will never have a measurable amount of PSA in his blood after the radical prostatectomy.

An accurate prediction of the recurrence of cancer resulting from the metastasis of prostate tissue benefits patients by allowing only those patients with a prediction of cancer recurrence to undergo drastic treatments with harmful side effects. However, the prediction generated by the improved histopathological scoring method 27 using only the border index as the shape index is not 100% accurate. A small portion of patients whose prostate tissue yields a border index less than the threshold of 1.051 nevertheless do not experience a biochemical recurrence of prostate cancer as measured by high PSA levels. In order to reduce the number of false positive predictions of prostate cancer recurrence, additional shape indices are determined from the digital image of a patient's prostate tissue. Then the prediction of cancer recurrence can be made only if all of the shape indices fall below their respective predetermined threshold values.

Figure 14:
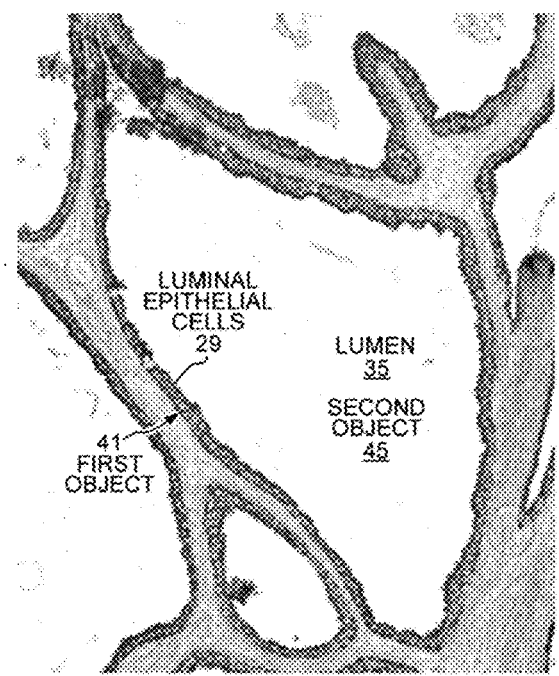
FIG. 14 is a more detailed view of the lumen identified in FIG. 8 and illustrates how a shape index is determined.

FIG. 14 illustrates the determination of a second shape index in addition to the border index that can be used in scoring method 27. FIG. 14 is a more detailed view of second object 45, which is a lumen. Darker luminal epithelial cells 29 that have been stained by CK18 surround the lighter area of second object 45. The ring of stained cells 29 make up the first object 41. The entire area enclosed by the luminal epithelial cells 29 is an individual gland. The second shape index is the relative area of the lumen compared to the entire area of the gland. In this case, the second shape index is the area of second object 45 divided by the sum of the areas of second object 45 and the surrounding first object 41.

Figure 15:
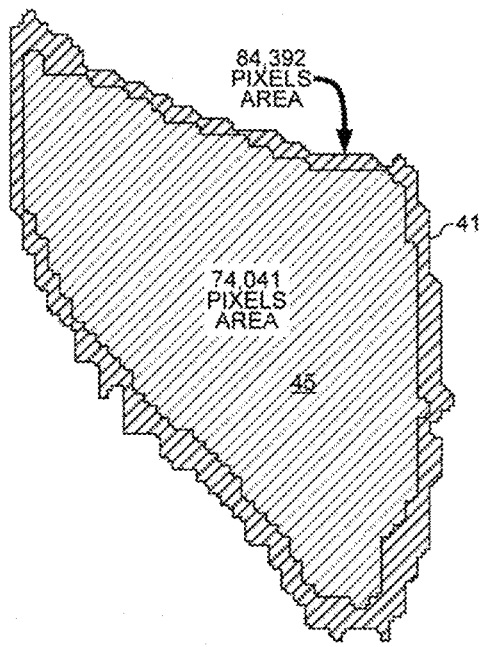
FIG. 15 illustrates how an area-of-lumen-to-gland index is calculated for the lumen identified in FIG. 8

FIG. 15 shows the calculation of the area-of-lumen-to-gland index for second object 45. The area of gland 41 is 84,392 pixels, and the area of lumen 45 is 74,041 pixels. Thus, the relative-area index for second object 45 is 0.8773. In scoring method 27, the relative-area index is determined for each of the second objects after the average border index is determined in step 24. Then the average relative-area index is determined for all of the second objects in image 46. Finally, the prediction is made in step 25 that patient 17 will likely have a recurrence of cancer only if both (i) the average border index is less than the first predetermined threshold value of 1.051, and (ii) the average relative-area index is less than a second predetermined threshold value.

In another embodiment, the average of the relative-area index is calculated by summing the areas of all of the second objects in image 46 and dividing that total area by the sum of the areas of all of the glands in image 46. This alternative method for averaging the relative-area index places a smaller weighting on the contribution from small lumens. If this alternative method is used, then the one-pixel objects need not be excluded from the "lumen" class because their contribution to the shape index is de-emphasized.

The second predetermined threshold value is also determined imperically based on the relative-area index of many patients whose post-operation PSA levels are known. Patients who had a recurrence of PSA after their radical prostatectomy usually had a relative-area index of less than 0.450. Thus, system 10 predicts that a patient will likely have a recurrence of prostate cancer if both his average shape index is less than 1.051 and his average relative-area index is less than 0.450. The average relative-area index for all of the second objects in image 46 of stained tissue from patient 17 is 0.5652. Therefore, system 10 predicts that patient 17 will not likely have a recurrence of prostate cancer because both his average shape index of 1.0616 is not less than the first predetermined threshold of 1.051 and his average relative-area index of 0.5652 is not less than the second predetermined threshold of 0.450. At the time of the radical prostatectomy of patient 17, system 10 predicts that after the elapse of several months following the prostatectomy, there will still be no measurable level of PSA in the blood of patient 17.

Figure 16:
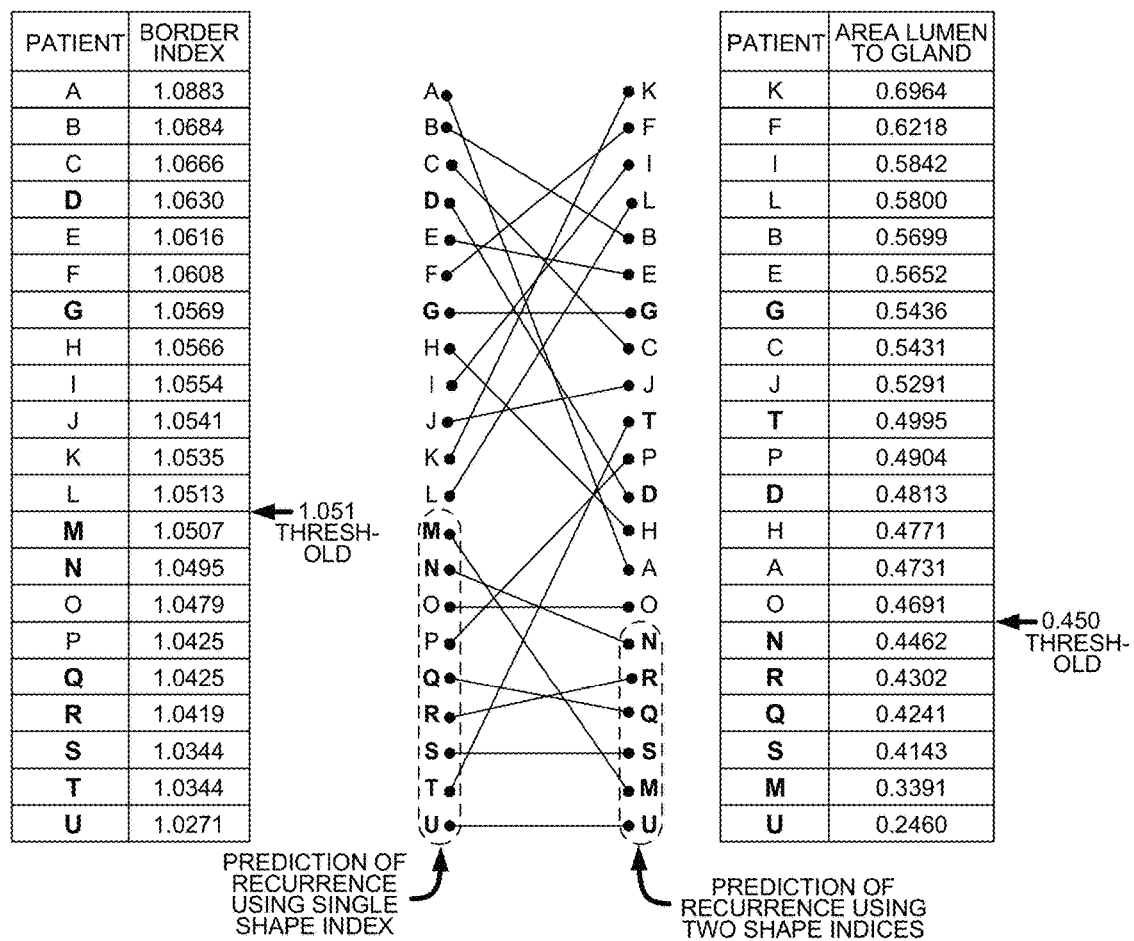
FIG. 16 is a table listing both a first shape index and a second shape index determined from digital images of stained prostate tissue from twenty-one prostate cancer patients.

FIG. 16 shows both a first shape index and a second shape index determined from digital images of stained prostate tissue from twenty-one prostate cancer patients A-U. The results for patient 17 are listed under patient E. The first shape index is the border index, and the second shape index is the relatice-area-of-lumen-to-gland index. Based only on the border index, scoring method 27 predicts that each of patients M-U will likely have a recurrence of cancer because each has an average border index that is less than the predetermined threshold value of 1.051. After steps 23-24 were repeated using the second relative-area index, scoring method 27 predicts that only patients M-N, Q-S and U will likely have a recurrence of cancer because each has both an average border index less than 1.051 and an average relative-area index less than the second predetermined threshold value of 0.450.

A physician could conclude from the prediction made by scoring method 27 that only the patients M-N, Q-S and U should undergo therapies that are very costly or have significant harmful side effects. The physician could recommend other less drastic treatments for the remaining patients to prevent the recurrence of prostate cancer. The bolded letters in FIG. 16 indicate the patients who actually had a biochemical recurrence of prostate cancer as measured by detectable PSA levels following their radical prostatectomies. Patients D and G did have a recurrence of prostate cancer despite method 27 predicting that the risk of cancer recurrence was low.

The accuracy of the histopathological scoring method 27 can be improved by repeating steps 23-24 using more than one or two shape indices and by applying the additional associated thresholds in step 25. The geometric features upon which the additional shape indices can be based include the length, width, border length, area, asymmetry, elliptical fit, roundness and number of branches of an image object. The shape indices are based on these geometric features of the second objects (lumens), the first objects (luminal epithelial cells) or the entire glands (area enclosed by the first objects). Some examples of additional shape indices include: lumen length divided by width; roundness of lumen divided by area of gland; lumen length times asymmetry; sum of lumen area to entire tissue in image; sum of lumen area to stroma area in image; and sum of area of luminal epithelial cells to entire tissue in image.

No shape index is calculated based on a geometric feature of one object compared to a geometric feature of a neighboring object. For example, none of the shape indices is based on the geometry of one gland or lumen compared to the geometry of a neighboring gland or lumen. Thus, the novel scoring method 27 is based on the geometric characteristics of individual stained image objects but not on any pattern made by the stained image objects. So no subjective scoring of tissue patterns is necessary. The prediction made by scoring method 27 is based only on the geometry of individual lumens or glands as opposed to patterns or the architecture of clumps of glands, as is used in conventional Gleason scoring. By eliminating the subjective matching of tissue patterns, the consistency of the histopathological score is improved compared to a Gleason score. Moreover, the novel scoring method 27 can be fully automated because it does not require human judgment to determine whether each localized region of a tissue slide best fits into one of the five Gleason patterns shown in FIG. 7.

The accuracy of the histopathological scoring method 27 can also be improved by factoring in the age of the patient 17. Prostate cancer tends to have a higher probability of metastesizing in younger patients. Therefore, the average of each shape index can be multiplied by an age factor that is minimally less than one for younger patients before the average shape index is compared to the predetermined threshold. In one embodiment, an age factor of 0.99 is multiplied by the average shape index for patients seventy years old or younger. For example, patient G is sixty-nine years old at the time of the scoring, so the average border index of 1.0569 for patient G is multiplied by the age factor of 0.99 to yield a scaled average border index of 1.0463. Because 1.0463 is less than the first predetermined threshold of 1.051, scoring method 27 using the age factor would predict that patient G has a high risk of cancer recurrence instead of a low risk as predicted before the scaling.

The histopathological scoring method 27 can be used for more than just predicting the recurrence or non-recurrence of glandular tissue cancer. The average shape indices generated by method 27 can be converted into histopathological scores that indicate the level of cancer malignancy of the glandular tissue. For example, although method 27 predicts that the prostate cancer depicted in the images of all patients A-L has a low likelihood of recurring following a radical prostatectomy, the magnitudes of the average border indices also indicate that the malignancy of patient L's cancer is more severe than that of patient A's cancer. By using more shape indices, the accuracy of the indicated degree of malignancy can be improved. For example, a histopathological score can be generated by multiplying the border index by the relative-area index. A lower histopathological score is indicative of a higher level of cancer malignancy of the tissue.

FIG. 17 is a table listing a histopathological score generated from images of each of the twenty-one prostate cancer patients. The score was obtained by multiplying the border index by the relative-area index. The patients are sorted from highest score at the top to lowest score at the bottom. A higher score indicates a lower level of cancer malignancy of the glandular tissue. For example, although method 27 predicts that patients K-L will not have a recurrence of prostate cancer, the scores for patients K-L are just above the first threshold based on the border index alone. However, the histopathological score generated using both the border index and the relative-area index indicates that the level of malignancy of the cancer of both patients K and L is less severe than that of most of the other twelve patients predicted not to have a recurrence of prostate cancer. The scoring method 27 can be used before a prostatectomy is performed based on a needle tissue sample taken from the cancer patient 17. In the case of patients such as K and L, the histopathological score is indicative of a low level of cancer malignancy, which might lead a physician to postpone a radical prostatectomy for such patients, especially if the patients are over the age of seventy.

FIG. 18 is a table listing yet another histopathological score generated from images of each of the twenty-one prostate cancer patients. The score in FIG. 18 was obtained by multiplying the relative-area index by a weighted border index. In this case, the border index for each second object is multiplied by the number of pixels in that second object. One-pixel objects and small lumens are not excluded from the "lumen" class in this embodiment because the weighted border index de-emphasizes the contribution of the small lumens. Again, the patients are sorted in FIG. 18 from highest score at the top to lowest score at the bottom, and the bolded letters indicate the patients who actually had a biochemical recurrence of prostate cancer. The product of the two shape indices listed in FIG. 18 can be used both to predict the recurrence of prostate cancer and as a histopathological score indicative of the level of malignancy of prostate cancer. A predetermined threshold of 11.500 was determined empirically. Method 27 predicts that cancer patients D, M-O and Q-U will likely have a recurrence of cancer because the histopathological score for those patients is below the threshold of 11.500. Of the patients predicted to have a recurrence of cancer, only patient O did not have a recurrence. In addition, the histopathological score generated using the weighted border index and the relative-area index indicates the relative level of malignancy of the cancer of the patients. Patients with a higher score have less malignant cancer.

FIG. 18 also lists the conventional Gleason scores obtained from the images of each of the twenty-one prostate cancer patients. It is apparent that classifying patients by Gleason scores of 6, 7A and 7B provides no reliable prediction of the recurrence of prostate cancer following a radical prostatectomy. Patients who had a recurrence of cancer (in bold letters) and patients who had no recurrence of cancer were equally likely to be assigned Gleason scores of 6, 7A and 7B. However, the scores generated by method 27 accurately predicted the recurrence or non-recurrence of cancer to all patients except patients G and O. In addition, the histopathological score generated by method 27 indicates that the malignancy of the cancer of patients B-C, F and K is less severe than that indicated by the assigned Gleason scores of 7A and 7B. The score generated by method 27 also indicates that the malignancy of the cancer of patient S is more severe than that indicated by the assigned Gleason scores of 6. Thus, the score generated by method 27 may also be a more accurate indication of malignancy than a conventional Gleason score.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    identifying objects in a digital image of glandular tissue from a cancer patient, wherein the objects are identified based on staining by a biomarker of the glandular tissue;
    performing digital image analysis to measure a geometric characteristic of individual identified objects, wherein the geometric characteristic is based on a border length of the individual identified objects; and
    predicting that the cancer patient will have a recurrence of cancer of the glandular tissue based on the measured geometric characteristic of the individual identified objects but not based on any pattern formed by a plurality of the identified objects.

2. The method of claim 1, wherein the glandular tissue is taken from the group consisting of: prostate tissue, breast tissue, colon tissue, and lung tissue.

3. The method of claim 1, wherein the glandular tissue is prostate tissue, and wherein the predicting the recurrence of cancer is performed by predicting the recurrence of measurable prostate-specific antigen (PSA) in the cancer patient's blood.

4. The method of claim 1, wherein the biomarker is cytokeratin 18 (CK18).

5. The method of claim 1, wherein the glandular tissue is prostate tissue, wherein the biomarker stains luminal epithelial cells, and wherein the identified objects are lumens surrounded by stained luminal epithelial cells.

6. The method of claim 1, wherein the geometric characteristic is taken from the group consisting of: a length of each individual identified object, a width of each individual identified object, and the border length of each individual identified object.

7. The method of claim 1, wherein the geometric characteristic is a quotient of a border length of each individual identified object divided by two times the sum of a length and a width of a rectangle, wherein an index ellipse is the smallest ellipse that can enclose each individual identified object, wherein the rectangle is formed based on the index ellipse, and wherein the rectangle has an area equal to that of each individual identified object.

8. A method comprising:
    generating first objects from a digital image of a slice of tissue from a cancer patient that has been stained with a stain that stains luminal epithelial cells;
    generating second objects that are surrounded by the first objects;
    determining a shape index for each of the second objects, wherein the shape index is calculated based on a measured geometric feature of each of the second objects;
    determining an average of the shape index of the second objects; and
    predicting that the cancer patient will likely have a recurrence of cancer if the average of the shape index is less than a predetermined threshold value.

9. The method of claim 8, wherein the measured geometric feature is a border length around each of the second objects.

10. The method of claim 8, wherein the geometric feature is taken from the group consisting of: a length, a width, a border length, an area, an asymmetry, an elliptical fit, a roundness, and a number of branches.

11. The method of claim 8, wherein the shape index for each of the second objects is not based on any characteristic of any other second object.

12. The method of claim 8, wherein the determining the shape index comprises:
   determining a border length around each of the second objects;
   determining a length based on each of the second objects; and
   determining a width perpendicular to the length, wherein the width is based on each of the second objects; and
   determining the shape index for each of the second objects by dividing the border length by twice the sum of the length and width.

13. The method of claim 8, wherein in the second objects are unstained areas on the digital image that are surrounded by stained luminal epithelial cells.

14. The method of claim 8, wherein the tissue is stained with a single stain.

15. The method of claim 8, wherein the stain is cytokeratin 18 (CK18).

16. The method of claim 8, wherein the predicting that the cancer patient will likely have a recurrence of cancer predicts that the cancer patient will have a recurrence of measurable amounts of prostate-specific antigen in the cancer patient's blood.

17. The method of claim 8, further comprising:
   determining a histopathological score based on the average of the shape index, wherein the histopathological score is indicative of a level of cancer malignancy of the tissue.

18. A method comprising:
   generating first objects from a digital image of glandular tissue that has been stained with a biomarker that stains epithelial cells;
   generating second objects using the first objects;
   determining a geometric feature of each of the second objects;
   calculating a shape index for each of the second objects based on the geometric feature;
   determining an average shape index of the second objects; and
   determining a score based on the shape index, wherein the score indicates a level of cancer malignancy of the glandular tissue.

19. The method of claim 18, wherein the geometric feature is taken from the group consisting of: a length, a width, a border length, an area, an asymmetry, an elliptical fit, a roundness, and a number of branches.

20. The method of claim 18, wherein the glandular tissue is a needle tissue sample taken from a cancer patient.

21. The method of claim 18, wherein the shape index for each of the second objects is not based on any characteristic of any other second object.

* * * * *